United States Patent
Chen

(10) Patent No.: US 6,990,167 B2
(45) Date of Patent: Jan. 24, 2006

(54) IMAGE RECONSTRUCTION METHOD FOR DIVERGENT BEAM SCANNER

(75) Inventor: Guang-Hong Chen, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 265 days.

(21) Appl. No.: 10/651,673

(22) Filed: Aug. 29, 2003

(65) Prior Publication Data

US 2005/0047542 A1 Mar. 3, 2005

(51) Int. Cl.
*A61B 6/03* (2006.01)

(52) U.S. Cl. .......................................... 378/4; 378/901
(58) Field of Classification Search ................ 378/4, 378/8, 15, 901
See application file for complete search history.

(56) References Cited

U.S. PATENT DOCUMENTS

| | | | |
|---|---|---|---|
| 5,257,183 A | | 10/1993 | Tam |
| 5,270,926 A | | 12/1993 | Tam |
| 5,400,255 A | | 3/1995 | Hu |
| 5,625,660 A | | 4/1997 | Tuy |
| 5,881,123 A | * | 3/1999 | Tam ............................ 378/4 |
| 6,097,784 A | | 8/2000 | Tuy |
| 6,104,775 A | | 8/2000 | Tuy |
| 6,219,441 B1 | | 4/2001 | Hu |
| 6,292,525 B1 | * | 9/2001 | Tam ............................ 378/4 |
| 6,504,892 B1 | * | 1/2003 | Ning ........................... 378/4 |
| 2003/0097063 A1 | * | 5/2003 | Wang et al. ................ 600/425 |

OTHER PUBLICATIONS

Image Reconstruction From Fan–Beam Projections On Less Than A Short Scan, Phys. Med. Biol. 47 (2002) 2525–2546; Noo, et al.

* cited by examiner

*Primary Examiner*—David V Bruce
(74) *Attorney, Agent, or Firm*—Quarles & Brady LLP

(57) ABSTRACT

A new image reconstruction method is described for CT systems. Reconstruction formulas for general application to any CT system geometry are derived and more specific formulas for two third generation CT system geometries are described. A preferred embodiment of a CT system which employs one of the specific formulas is described.

13 Claims, 7 Drawing Sheets

IMAGE RECONSTRUCTION METHOD FOR DIVERGENT BEAM SCANNER

STATEMENT REGARDING FEDERALLY SPONSORED RESEARCH

This invention was made with government support under Grant No. HL66488 awarded by the National Institute of Health. The United States Government has certain rights in this invention.

BACKGROUND OF THE INVENTION

The present invention relates to computed tomography (CT) imaging apparatus; and more particularly, to a method for reconstructing images from acquired x-ray attenuation measurements.

In a current computed tomography system, an x-ray source projects a fan-shaped beam which is collimated to lie within an X-Y plane of a Cartesian coordinate system, termed the "imaging plane." The x-ray beam passes through the object being imaged, such as a medical patient, and impinges upon an array of radiation detectors. The intensity of the transmitted radiation is dependent upon the attenuation of the x-ray beam by the object and each detector produces a separate electrical signal that is a measurement of the beam attenuation. The attenuation measurements from all the detectors are acquired separately to produce the transmission profile.

The source and detector array in a conventional CT system are rotated on a gantry within the imaging plane and around the object so that the angle at which the x-ray beam intersects the object constantly changes. A group of x-ray attenuation measurements from the detector array at a given angle is referred to as a "view" and a "scan" of the object comprises a set of views made at different angular orientations during one revolution of the x-ray source and detector. In a 2D scan, data is processed to construct an image that corresponds to a two dimensional slice taken through the object. The prevailing method for reconstructing an image from 2D data is referred to in the art as the filtered backprojection technique. This process converts the attenuation measurements from a scan into integers called "CT numbers" or "Hounsfield units", which are used to control the brightness of a corresponding pixel on a display.

The term "generation" is used in CT to describe successively commercially available types of CT systems utilizing different modes of scanning motion and x-ray detection. More specifically, each generation is characterized by a particular geometry of scanning motion, scanning time, shape of the x-ray beam, and detector system.

As shown in FIG. 1, the first generation utilized a single pencil x-ray beam and a single scintillation crystal-photomultiplier tube detector for each tomographic slice. After a single linear motion or traversal of the x-ray tube and detector, during which time 160 separate x-ray attenuation or detector readings are typically taken, the x-ray tube and detector are rotated through 1° and another linear scan is performed to acquire another view. This is repeated typically to acquire 180 views.

A second generation of devices developed to shorten the scanning times by gathering data more quickly is shown in FIG. 2. In these units a modified fan beam in which anywhere from three to 52 individual collimated x-ray beams and an equal number of detectors are used. Individual beams resemble the single beam of a first generation scanner. However, a collection of from three to 52 of these beams contiguous to one another allows multiple adjacent cores of tissue to be examined simultaneously. The configuration of these contiguous cores of tissue resembles a fan, with the thickness of the fan material determined by the collimation of the beam and in turn determining the slice thickness. Because of the angular difference of each beam relative to the others, several different angular views through the body slice are being examined simultaneously. Superimposed on this is a linear translation or scan of the x-ray tube and detectors through the body slice. Thus, at the end of a single translational scan, during which time 160 readings may be made by each detector, the total number of readings obtained is equal to the number of detectors times 160. The increment of angular rotation between views can be significantly larger than with a first generation unit, up to as much as 36°. Thus, the number of distinct rotations of the scanning apparatus can be significantly reduced, with a coincidental reduction in scanning time. By gathering more data per translation, fewer translations are needed.

To obtain even faster scanning times it is necessary to eliminate the complex translational-rotational motion of the first two generations. As shown in FIG. 3, third generation scanners therefore use a much wider fan beam. In fact, the angle of the beam may be wide enough to encompass most or all of an entire patient section without the need for a linear translation of the x-ray tube and detectors. As in the first two generations, the detectors, now in the form of a large array, are rigidly aligned relative to the x-ray beam, and there are no translational motions at all. The tube and detector array are synchronously rotated about the patient through an angle of 180–360°. Thus, there is only one type of motion, allowing a much faster scanning time to be achieved. After one rotation, a single tomographic section is obtained.

Fourth generation scanners feature a wide fan beam similar to the third generation CT system as shown in FIG. 4. As before, the x-ray tube rotates through 360° without having to make any translational motion. However, unlike in the other scanners, the detectors are not aligned rigidly relative to the x-ray beam. In this system only the x-ray tube rotates. A large ring of detectors are fixed in an outer circle in the scanning plane. The necessity of rotating only the tube, but not the detectors, allows faster scan time.

Most of the commercially available CT systems employ image reconstruction methods based on the concepts of Radon space and the Radon transform. For the pencil beam case, the data is automatically acquired in Radon space. Therefore a Fourier transform can directly solve the image reconstruction problem by employing the well-known Fourier-slice theorem. Such an image reconstruction procedure is called filtered backprojection (FBP). The success of FBP reconstruction is due to the translational and rotational symmetry of the acquired projection data. In other words, in a parallel beam data acquisition, the projection data are invariant under a translation and/or a rotation about the object to be imaged. For the fan beam case, one can solve the image reconstruction problem in a similar fashion, however, to do this an additional "rebinning" step is required to transform the fan beam data into parallel beam data. The overwhelming acceptance of the concepts of Radon space and the Radon transform in the two dimensional case gives this approach to CT image reconstruction a paramount position in tomographic image reconstruction.

The Radon space and Radon transformation reconstruction methodology is more problematic when applied to three-dimensional image reconstruction. Three-dimensional CT, or volume CT, employs an x-ray source that projects a cone beam on a two-dimensional array of detector elements as shown in FIG. 5. Each view is thus a 2D array of x-ray attenuation measurements and a complete scan produced by acquiring multiple views as the x-ray source and detector array are revolved around the subject results in a 3D array of attenuation measurements. The reason for this difficulty is that the simple relation between the Radon transform and the x-ray projection transform for the 2D case in not valid in the 3D cone beam case. In the three-dimensional case, the Radon transform is defined as an integral over a plane, not an integral along a straight line. Consequently, we have difficulty generalizing the success of the Radon transform as applied to the 2D fan beam reconstruction to the 3D cone beam reconstruction. In other words, we have not managed to derive a shift-invariant FBP method by directly rebinning the measured cone beam data into Radon space. Numerous solutions to this problem have been proposed as exemplified in U.S. Pat. Nos. 5,270,926; 6,104,775; 5,257,183; 5,625,660; 6,097,784; 6,219,441; and 5,400,255.

SUMMARY OF THE INVENTION

The present invention is a method for reconstructing an image from fan beam attenuation measurements that does not rely on the Radon transformation method. A general method for reconstructing an image from fan beam projection views includes: calculating the derivative of each projection along the trajectory of the x-ray source; convolving the derivative data with a kernel function; back projecting the convolved data with a weight function; and add the back projected data to the image. A more specific application of this method to a third generation scanner having a circular x-ray source trajectory and either a flat or actuate detector array includes: filtering each acquired projection view by a first filter factor; backprojecting each resulting filtered view $Q_1(\theta)$ with a first weight; adding the backprojected data to the image; filtering each acquired projection view by a second filter factor; backprojecting each resulting filtered view $Q_2(\theta)$ with a second weight; and adding the backprojected data to this image. The image evolves as projection views are acquired and processed from a blurry and unrecognizable subject to a finished image.

A general object of this invention is to accurately reconstruct an image from a scan using a fan beam source and a detector array. Accurate images may be reconstructed when the source travels in a circular path around the object to be imaged or when the path is not circular.

Another object of the invention is to provide an image reconstruction method in which each acquired view is processed and added to an image. Rather than acquiring the entire raw data set and then reconstructing an image therefrom, the present invention enables each view to be processed as the scan is conducted. The image thus evolves as the scan is conducted.

Another object of the invention is to reduce the number of views needed to satisfy data sufficiency conditions. To meet this condition it is only necessary that the x-ray source travel around the object being imaged such that any straight line through the object in the plane of the x-ray source motion will intersect the x-ray source path. This means that when smaller objects are being imaged, views over a smaller range of view angles need be acquired to satisfy this sufficiency condition. This translates to less radiation exposure and is particularly advantageous for pediatric imaging.

The foregoing and other objects and advantages of the invention will appear from the following description. In the description, reference is made to the accompanying drawings which form a part hereof, and in which there is shown by way of illustration a preferred embodiment of the invention. Such embodiment. does not necessarily represent the full scope of the invention, however, and reference is made therefore to the claims and herein for interpreting the scope of the invention.

GENERAL DESCRIPTION OF THE INVENTION

The present invention is a new method for reconstructing images from acquired divergent beam projections. This method will be described with respect to 2D fan-beam projections, but the approach is also applicable to 3D cone beam projections.

Figure 1:
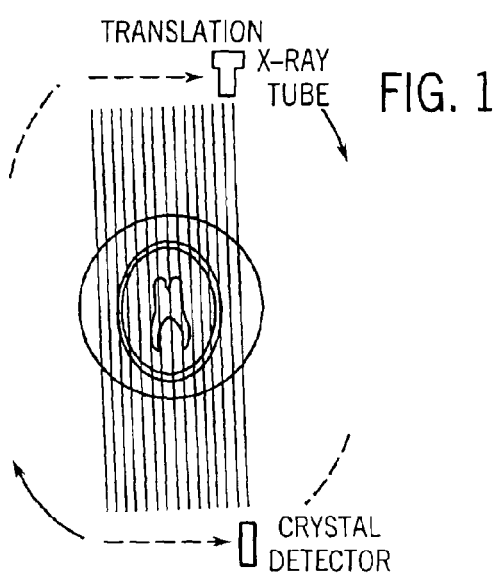
FIGS. 1–4 are schematic representations of different CT system geometries.
Figure 2:
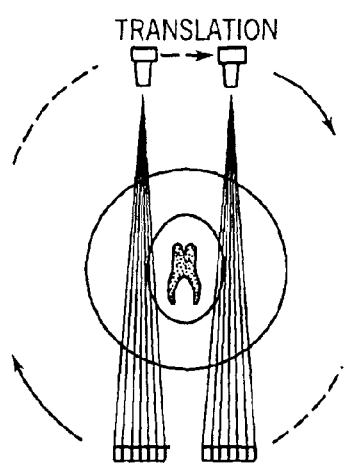
Figure 3:
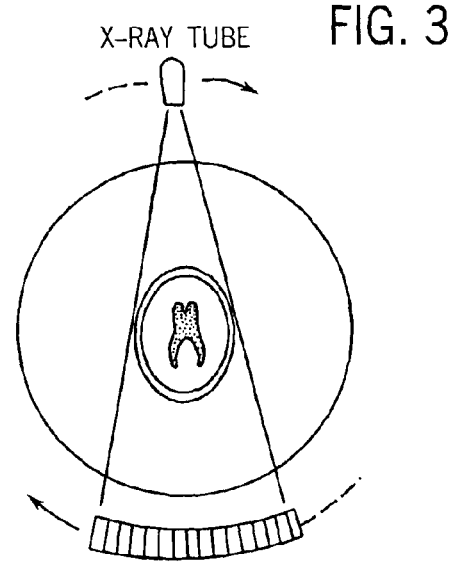
Figure 4:
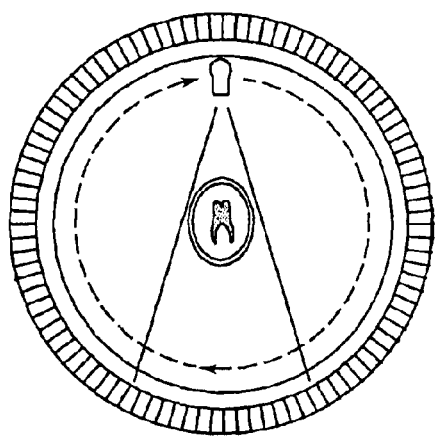
Figure 5:
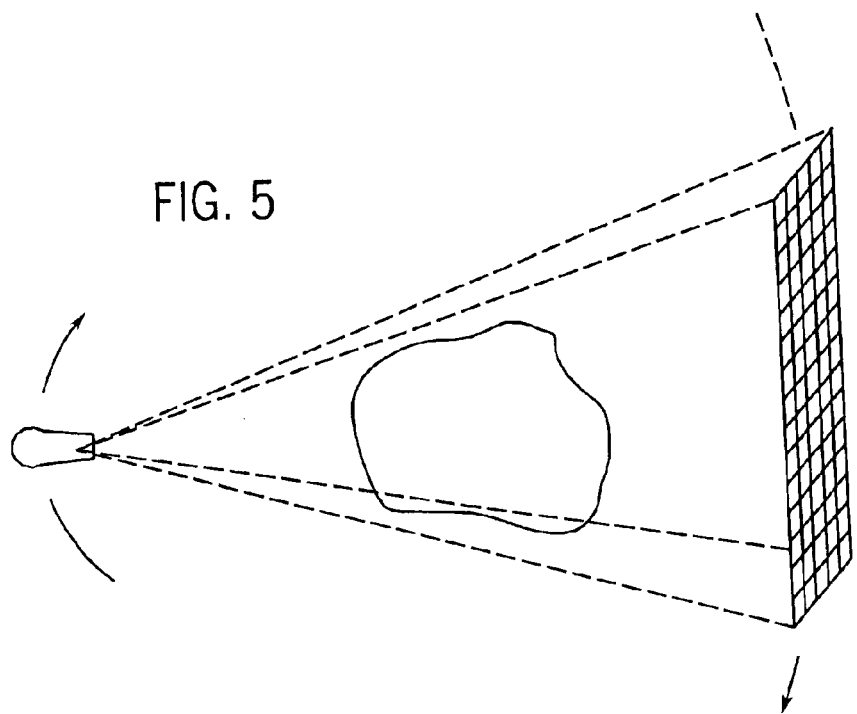
FIG. 5 is a pictorial representation of a 3D, or volume, CT system.
Figure 6:
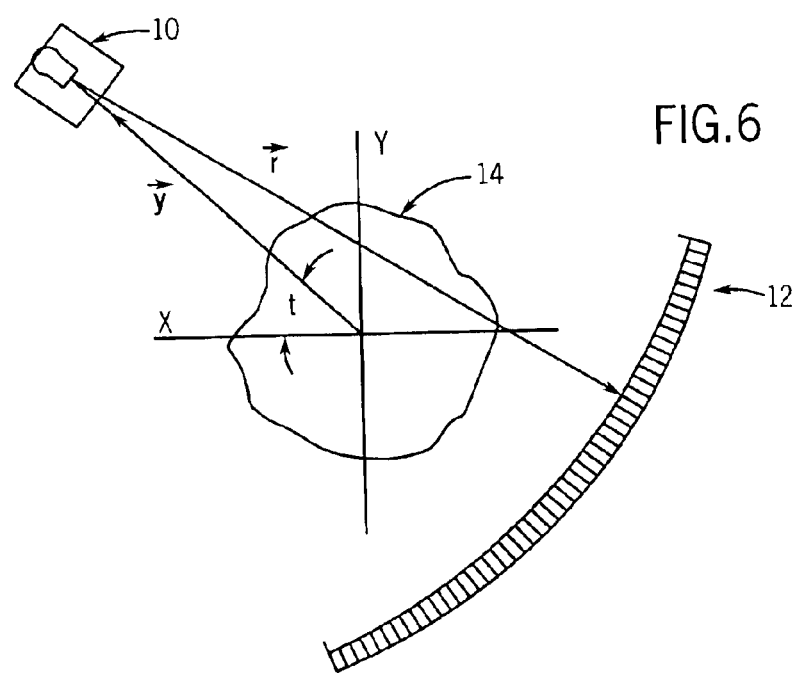
FIG. 6 is a schematic representation of a third generation CT system with a coordinate system used to generally describe the invention.

We first define fan-beam projections $\bar{g}(\hat{r}, \vec{y})$ produced by an x-ray source 10 and a one-dimensional detector array 12 by a focal point vector $\vec{y}$ and a unit ray vector $\hat{r}$ as shown in FIG. 6

$$\bar{g}[\hat{r}, \vec{y}(t)] = \int_0^\infty ds\, f[\vec{y}(t) + s\hat{r}], \qquad (1)$$

where the focal point vector $\vec{y}(t)$ is parameterized by a single scalar parameter t which corresponds to view angle and s is the distance from the x-ray source along direction $\hat{r}$.

A reconstructed image function $f(\vec{x})$ of a finite object 14 is assumed to have a compact support $\Omega$. After we measure the data $\bar{g}(\hat{r}, \vec{y})$, we backproject the data along the ray with a weight 1/r, where r is the distance from the backprojected point to the x-ray source position. Namely, we have:

$$g(\hat{r}, \vec{y}) = \frac{1}{r}\vec{g}(\hat{r}, \vec{y}) = \int_0^\infty ds f[\vec{y}(t) + s\hat{r}] \tag{2}$$

where we decompose a vector into its magnitude and a unit vector which is denoted by a hat, e.g., $\vec{r} = r\hat{r}$. This backprojection procedure provides a two-dimensional array of the backprojected data.

Rather than invoke the two-dimensional Radon inversion formula, we are going to use the Fourier transform and the inverse Fourier transform of image function $f(\vec{x})$. However, for the divergent beam problem, we lose the translational symmetry of the parallel beam problem. Therefore, we need an intermediate function to connect the projections $g(\vec{r}, \vec{y})$ defined in the Eq. (1) with the Fourier transform of the image function $f(\vec{x})$. To accomplish this goal, we now define an intermediate function $G_2(\vec{k}, \vec{y})$ by taking a local Fourier transform for the vector $\vec{r}$ in fan beam projections $g(\vec{r}, \vec{y})$.

$$\begin{aligned}G_2(\vec{k}, \vec{y}) &= \int d^2\vec{r}\, g(\vec{r}, \vec{y}) e^{-i2\pi\vec{k}\cdot\vec{r}}, \\ &= \int_0^\infty ds \int d^2\vec{r}\, f(\vec{y} + s\hat{r}) e^{-i2\pi\vec{k}\cdot\vec{r}}, \\ &= \int_0^\infty \frac{ds}{s^2} e^{-i2\pi\vec{k}\cdot\vec{y}/s} \int d^2\vec{z}\, f(\vec{z}) e^{-i2\pi\vec{k}\cdot\vec{z}/s}, \\ &= \int_0^\infty \frac{ds}{s^2} e^{-i2\pi\vec{k}\cdot\vec{y}/s} \tilde{f}\left(\frac{\vec{k}}{s}\right).\end{aligned} \tag{3}$$

In the last two lines, we introduced a new variable $\vec{z}$ and Fourier transform for object function $f(\vec{x})$ as $$\vec{z} = \vec{y} + s\hat{r}, \tag{4}$$

$$\tilde{f}(\vec{k}) = \int d^2\vec{x}\, f(\vec{x}) e^{i2\pi\vec{k}\cdot\vec{x}}. \tag{5}$$

The scaling property set forth in Eq. (2) of fan beam projections is nicely preserved in this intermediate function $G_2(\vec{k}, \vec{y})$. That is $$G_2(\vec{k}, \vec{y}) = \frac{1}{k} G_2(\hat{k}, \vec{y}). \tag{6}$$

To further simplify Eq. (3), we change variables from $s$ to $\tau$ through $\tau = k/s$. One obtains $$\begin{aligned}G_2(\vec{k}, \vec{y}) &= \frac{1}{k} \int_0^\infty d\tau\, \tilde{f}(\tau\hat{k}) e^{-i2\pi\vec{k}\cdot\vec{y}}, \\ &= \frac{1}{k} \int_0^\infty d\tau\, \tilde{f}(\vec{\tau}) e^{-i2\pi\vec{\tau}\cdot\vec{y}},\end{aligned} \tag{7}$$

where $\vec{\tau} = \tau\hat{k}$ has been introduced. A comparison of Eq. (7) with Eq. (6) gives $$G_2(\hat{k}, \vec{y}) = \int_0^\infty d\tau\, \tilde{f}(\vec{\tau}) e^{i2\pi\vec{\tau}\cdot\vec{y}}. \tag{8}$$

This form of the intermediate function $G_2$ is very suggestive. It is reminiscent of an inverse Fourier transform of object function $f(\vec{x})$ in a polar coordinate system. To make this more apparent, we take the partial derivative with respect to the source trajectory parameter t for both sides of Eq. (8).

$$\frac{1}{i2\pi\hat{k}\cdot\vec{y}'(t)} \frac{\partial}{\partial t} G_2[\hat{k}, \vec{y}(t)] = \int_0^\infty d\tau\, \tau\, \tilde{f}(\vec{\tau}) e^{i2\pi\vec{\tau}\cdot\vec{y}}. \tag{9}$$

We now can see that the right hand side of the equation is exactly the radial part of an inverse Fourier transform of the image function. The next step is to integrate the above equation over the polar angle $\phi_k$ of unit vector $\hat{k}$, that is $$\int_0^{2\pi} d\phi_k \int_0^\infty d\tau\, \tau\, \tilde{f}(\vec{\tau}) e^{i2\pi\vec{\tau}\cdot\vec{y}} = \int_0^{2\pi} d\phi_k \frac{1}{i2\pi\hat{k}\cdot\vec{y}'(t)} \frac{\partial}{\partial t} G_2[\hat{k}, \vec{y}(t)]. \tag{10}$$

If we impose the following condition, $$\hat{k}\cdot\vec{x} = \hat{k}\cdot\vec{y}(t), \tag{11}$$

on source trajectory for each point $\vec{x}$ within the region of interest ("ROI") and an arbitrary unit vector $\hat{k}$, we can now safely replace the exponential factor in the right hand side (RHS) of equation (10) by $\exp(i2\pi\vec{\tau}\cdot\vec{x})$. Thus, the RHS of equation (10) is the inverse Fourier transform. Therefore, we obtain the following general inversion formula for the fan beam projections, $$f(\vec{x}) = \int_0^{2\pi} d\phi_k \frac{1}{i2\pi\hat{k}\cdot\vec{y}'(t)} \frac{\partial}{\partial t} G_2[\hat{k}, \vec{y}(t)]\bigg|_{\hat{k}\cdot[\vec{x}-\vec{y}(t)]=0}. \tag{12}$$

This inversion formula is the first of our main results. It tells us that we can generally reconstruct the image $f(\vec{x})$ from fan beam projections by three steps: first, calculating the intermediate function $G_2$; secondly, calculating the derivative of the intermediate function with respect to trajectory parameter t; finally, backprojecting the data with a weight $1/[2\pi i\hat{k}\cdot\vec{y}'(t)]$.

The general inversion formula in Eq. (12) can be reformatted into a form in which the filtered back projection step is more apparent. First we look at the intermediate function $G_2(\hat{k}, \vec{y})$. The main goal is to reduce the two-fold integral in Eq. (3) to a single integral. To do so, we choose to work in a polar coordinate system in which vector $\vec{r}$ is decomposed into $\vec{r} = (r, \phi_r) = r\hat{r}$. Thus the function $G_2(\hat{k}, \vec{y})$ can be calculated in the following way:

$$\begin{aligned}G_2(\hat{k}, \vec{y}) &= \int d^2\vec{r}\, g(\hat{r}, \vec{y}) e^{-i2\pi\hat{k}\cdot\vec{r}}, \\ &= \int_0^{2\pi} d\phi_r \int_0^\infty dr\, r g(r\hat{r}, \vec{y}) e^{-i2\pi r\hat{k}\cdot\hat{r}}, \\ &= \int_0^{2\pi} d\phi_r \bar{g}(\hat{r}, \vec{y}) \int_0^\infty dr\, e^{-i2\pi r\hat{k}\cdot\hat{r}}, \\ &= \int_0^{2\pi} d\phi_r \bar{g}(\hat{r}, \vec{y}) \int_{-\infty}^{+\infty} dr\, u(r) e^{-i2\pi r\hat{k}\cdot\hat{r}},\end{aligned} \tag{13}$$

where $u(r)$ is the step function. From the second line to the third line we used the scaling property in Eq. (2). The inner integral in the last line of Eq. (13) is the Fourier transform of the step function. That is $$\int_{-\infty}^{+\infty} dr u(r) e^{-i2\pi \hat{k}\cdot \hat{r}} = \frac{1}{2}\delta(\hat{k}\cdot \hat{r}) + \frac{1}{i2\pi \hat{k}\cdot \hat{r}}. \quad (14)$$

Note that both $\delta(\hat{k}\cdot\hat{r})$ and $1/\hat{k}\cdot\hat{r}$ are the degree −1 homogeneous functions and thus consistent with the scaling symmetry of $G_2(\hat{k}, \vec{y})$ in Eq. (6). A further simplification lies in the following observation: the first term is even under the transformation $\hat{k}\to -\hat{k}$, but the second term is odd. We should also recognize that the factor $\hat{k}\cdot\vec{y}'(t)$ in the inversion formula Eq. (12) is odd under the above parity transformation on $\hat{k}$. Since the integration over $\hat{k}$ is on a unit circle, we conclude that the contribution of the delta function term in the inversion formula Eq. (12) vanishes due to this parity symmetry on $\hat{k}$. Therefore, we only need to keep the second term in Eq. (14) for the inversion formula Eq. (12). That is, $$G_2(\hat{k}, \vec{y}) = \frac{1}{2\pi i} \int_0^{2\pi} d\phi_r \frac{\overline{g}(\hat{r}, \vec{y})}{\hat{k}\cdot \hat{r}}. \quad (15)$$

We emphasize again that the above equation is valid up to non-vanishing contribution in the inversion formula (12).

An examination of the general inversion formula Eq. (12) reveals that for a specific point $\vec{x}$ in the ROI and a specific unit vector $\hat{k}$, it is possible that there are several points $t_i(i=1, 2, \ldots)$ along the source trajectory satisfying Eq. (11). In other words, redundant data is acquired during the scan. In principle, any $t_i$ could be used in Eq. (12). Namely we can use only one projection and discard all the redundant others. However, such weighting scheme is not the optimal solution in practice. Here we keep a most general functional form with all the possible parameters for the weighting function. Since the possible solutions of Eq. (11) strongly depend on $\vec{x}$ and $\hat{k}$, a most general form of the weighting function is $w(\vec{x},\hat{k};t_i)$. This general form of the weighting function provides the opportunity to design new weighting methods. Two such methods will be described below. Physically, we impose the following normalization condition on $w(\vec{x},\hat{k};t_i)$:

$$\sum_{i=1}^{n(\vec{x},\hat{k})} w(\vec{x},\hat{k};t_i) = 1. \quad (16)$$

where $n(\vec{x},\hat{k})$ is the total number of redundant projections for Eq. (11). After taking this data redundancy into account, the general inversion formula (12) is modified into the following:

$$f(\vec{x}) = \int_0^{2\pi} d\phi_k \sum_{j=1}^{n(\vec{x},\hat{k})} \frac{w(\vec{x},\hat{k};t_i)}{i2\pi \hat{k}\cdot \vec{y}'(t_j)} \frac{\partial}{\partial q} G_2[\hat{k}, \vec{y}(q)]\big|_{q=t_j}, \quad (17)$$

This modified general inversion formula takes the average of all redundant projections that satisfy Eq. (11).

Equation (17) is not very convenient in practice because of the summation procedure it requires. We can eliminate the summation by using a trick widely used in physics and signal processing. The idea is to change a summation over discrete points into an integral over a continuous variable. To be more specific, we use the well-known identity of Dirac delta function:

$$\int_{-\infty}^{+\infty} dt f(t)\delta[g(t)] = \sum_i \frac{f(t_i)}{|g'(t_i)|}, \quad g'(t_i) \neq 0 \quad (18)$$

where $t_i(i=1, 2, \ldots)$ are the roots of equation $g(t)=0$. We now set function f(t) and g(t) as $$f(t) = sgn[\hat{k}\cdot \vec{y}'(t)] w(\vec{x},\hat{k};t) \frac{\partial}{\partial q} G_2(\hat{k},\vec{y}(q))\big|_{q=t}, \quad (19)$$

$$g(t) = \hat{k}\cdot[\vec{x} - \vec{y}(t)]. \quad (20)$$

Using Eq. (18), the summation in Eq. (17) can be written into an integral over the parameter t of the source trajectory. That is, $$f(\vec{x}) = \frac{1}{2\pi i}\int_0^{2\pi} d\phi_k \int dt w(\vec{x},\hat{k};t) \times \\
sgn[\hat{k}\cdot\vec{y}'(t)]\frac{\partial}{\partial q} G_2(\hat{k},\vec{y}(q))\big|_{q=t} \delta[\hat{k}\cdot(\vec{x}-\vec{y}(t))], \quad (21)$$

$$= \frac{1}{2\pi i}\int dt \int_0^{2\pi} d\phi_k \frac{w(\vec{x},\hat{k};t)}{|\vec{x}-\vec{y}(t)|} sgn[\hat{k}\cdot\vec{y}'(t)]\frac{\partial}{\partial q} G_2(\hat{k},\vec{y}(q))\big|_{q=t} \delta(\hat{k}\cdot\hat{\beta}),$$

where we used a simple relation $|x|=sgn(x)x$. The unit vector $\hat{\beta}$ in Eq. (21) is defined as $$\hat{\beta} = \frac{\vec{x}-\vec{y}(t)}{|\vec{x}-\vec{y}(t)|}. \quad (22)$$

From the first line to the second line in Eq. (21), we used the scaling property of Dirac delta function $\delta(ax)=\delta(x)/|a|$. Due to the Dirac delta function $\delta(\hat{k}\cdot\hat{\beta})$, the integral over unit vector $\hat{k}$ can now be easily performed. The result is $$f(\vec{x}) = \frac{1}{2\pi i}\int dt \frac{w(\vec{x},\hat{\beta}^{\perp};t)}{|\vec{x}-\vec{y}(t)|} sgn[\hat{\beta}^{\perp}\cdot\vec{y}'(t)]\frac{\partial}{\partial q} G_2[\hat{\beta}^{\perp},\vec{y}(q)]\big|_{q=t}, \quad (23)$$

where $\hat{\beta}^{\perp}$ is a unit vector perpendicular to $\hat{\beta}$,

With Eq. (23) and Eq. (15) in hand, we obtain the following fan beam reconstruction formula.

$$f(\vec{x}) = -\frac{1}{4\pi^2} \int dt \frac{w(\hat{\beta}^\perp \vec{x}; t)}{|\vec{x} - \vec{y}(t)|} \text{sgn}[\hat{\beta}^\perp \cdot \vec{y}'(t)] \int_0^{2\pi} d\phi_r \frac{1}{\hat{\beta}^\perp \cdot \hat{r}} \frac{\partial}{\partial q} g[\hat{r}, \vec{y}(q)] \Big|_{q=t}. \quad (24)$$

Therefore, after we replace the summation over the redundant data by the integral along the source trajectory, we end up with the reconstruction formula (24). This reconstruction formula is general because we did not specify any x-ray source trajectory nor any detector configuration. As soon as the trajectory of the x-ray source about the subject satisfies the data sufficiency condition, inversion formula (24) produces an accurate reconstruction of the acquired attenuation measurements.

To see the FBP structure in formula (24), we note that, in an arbitrary polar coordinate system, we have $$\hat{\beta}^\perp \cdot \hat{r} = \cos(\phi_{\beta^\perp} - \phi_r) \quad (25)$$

where $\phi_{\beta^\perp}$ and $\phi_r$ are the polar angle of the corresponding unit vectors $\hat{\beta}^\perp$, $\hat{r}$ respectively. Therefore, the implementation of Eq. (24) requires the following steps:

1. Calculate the derivative of each projection along the trajectory of the x-ray source;
2. Convolve the derivative data with the kernel function $1/\hat{\beta}^\perp \cdot \hat{r}$;
3. Backproject the convolved data with weight $w(\hat{\beta}^\perp, \vec{x}; t)\text{sgn}[\hat{\beta}^\perp \cdot \vec{y}'(t)]/|\vec{x} - \vec{y}(t)|$; and
4. Add the backprojected data to an image.

As views are acquired, processed and added to the image, the image evolves from a blurry, unrecognizable subject to a finished image.

Figure 7:
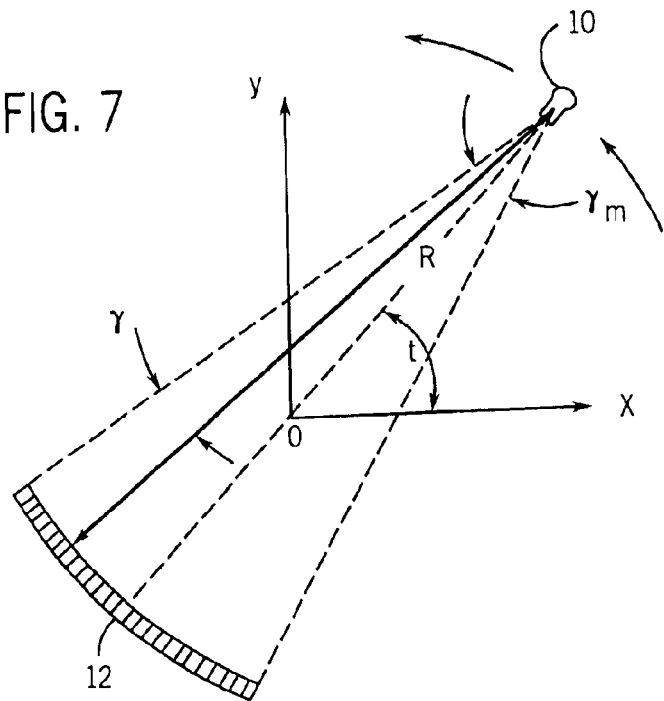
FIG. 7 is a schematic representation of a third generation CT system with coordinate system used to describe the application of the invention to one preferred embodiment.

We now apply this reconstruction method to a specific scanning configuration. As shown in FIG. 7 a third generation scanner having an x-ray source 10 at a radius R emits a fan beam over angle $\gamma_m$ which is received by an arc detector 12. In the Cartesian coordinate system shown in FIG. 7, a point $\vec{x}$ in the image of the ROI and focal point $\vec{y}(t)$ can be written as:

$$\vec{x} = (x, y), \quad \vec{y}(t) = R(\cos t, \sin t), \quad (26)$$

Similarly, the variable $\vec{\beta}$ and $\hat{\beta}^\perp$ in Eq. (24) are as follows:

$$\vec{\beta} = \vec{x} \to \vec{y}(t) = (x - R\cos t, y - R\sin t), \quad (27)$$

$$\hat{\beta}^\perp = \frac{\text{sgn}(x - R\cos t)}{|\vec{\beta}|}(R\sin t - y, x - R\cos t) \quad (28)$$

$$= (\cos\beta^\perp, \sin\beta^\perp).$$

Figure 8:
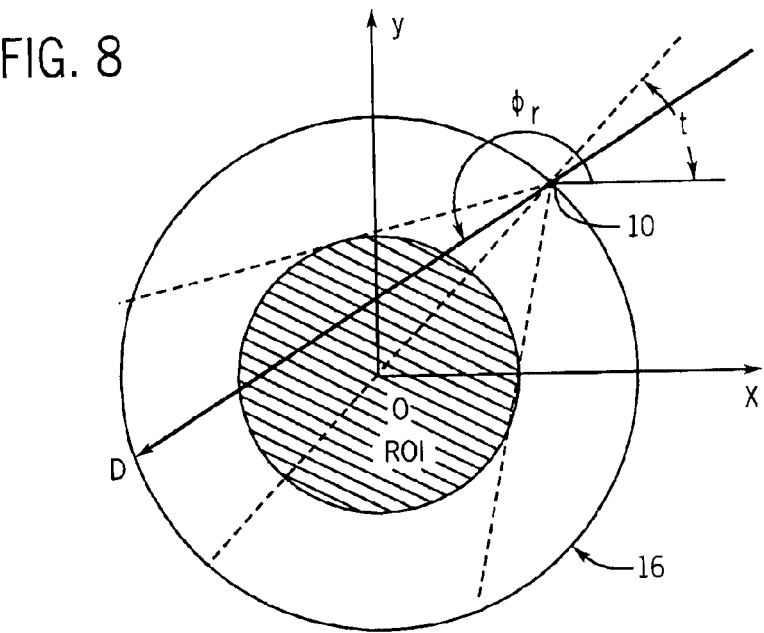
FIG. 8 is a schematic representation of the CT system of FIG. 7 with additional variables shown.

Here we specify one direction from two possible orientations for $\hat{\beta}^\perp$ as shown in FIG. 8. For a specific point $\vec{x}$ in the ROI and a specific angular x-ray focal point location t on the circular source trajectory 16, the polar angle $\beta^\perp$ is determined by the following equation:

$$\tan \beta^\perp = \frac{x - R\cos t}{R\sin t - y}. \quad (29)$$

The ROI is completely inside the gantry and thus, for any point $\vec{x}$ in the ROI, we have $$x\cos t + y\sin t < R, \quad \text{sgn}(x\cos t + y\sin t - R) = -1, \quad (30)$$

for any value of t. Therefore, a straightforward calculation gives $$\text{sgn}[\hat{\beta}^\perp \cdot \vec{y}'(t)] = -\text{sgn}(x - R\cos t). \quad (31)$$

Therefore, Eq. (24) can be expressed as follows for the third generation scanner of FIG. 7:

$$f(\vec{x}) = \frac{1}{4\pi^2} \int dt \frac{w(\vec{x}, t)\text{sgn}(x - R\cos t)}{|\vec{x} - \vec{y}(t)|} \quad (32)$$

$$\int_0^{2\pi} d\phi_r \frac{1}{\cos(\beta^\perp - \phi_r)} \frac{\partial}{\partial q} g(\phi_r, q) \Big|_{q=t}.$$

The weighting function is denoted as $w(\vec{x}, t) = w(\vec{x}, \hat{\beta}^\perp; t)$.

It is more convenient to define the location of each attenuation measurement by the location of the detector and the source at the moment the data is acquired. We denote the measured data as $g_m(\gamma, t)$ with $\gamma$ labeling the position of the detector and t labeling the location of the source as shown in FIG. 7. A data rebinning equation connects $g_m(\gamma, t)$ with $g_m(\phi_r, t)$. This relation can be easily established by observing the geometry in FIG. 7.

$$\phi_r = \pi - \frac{\gamma_m}{2} + t + \gamma, \quad (33)$$

$$g[\phi_r(\gamma, t), t] = g_m(\gamma, t), \quad (34)$$

where $\gamma_m$ is the total fan beam angle.

Using this relation, we immediately have an analytical understanding of taking the derivative with respect to the "source trajectory". To facilitate the discussion, we use simplest central difference to approximate the derivative. That is $$\frac{\partial}{\partial q} g(\phi_r, q) \Big|_{q=t} = \frac{g_m(\gamma - \Delta t, t + \Delta t) - g_m(\gamma + \Delta t, t - \Delta t)}{2\Delta}, \quad (35)$$

where $\Delta t$ is the angular distance between two successive view acquisitions. In the numerical implementation, the values of $g_m(\gamma - \Delta t, t + \Delta t)$ and $g_m(\gamma + \Delta t, t - \Delta t)$ are obtained by linear interpolation of the acquired measurements.

The reconstruction equations discussed above require that the derivative of the acquired attenuation data be calculated with respect to the x-ray source trajectory parameters $\phi_r$ and t. This is not desirable in practice because the numerical derivative of measured data which is also discrete can cause significant numerical errors. We can avoid this practical problem by doing two things: change the variables of integration in Eq. (32) from independent variables $\phi_r$ and t to the independent variables $\gamma$ and t; and move the differentiation operation on the acquired data somewhere else.

We accomplish these goals by using rebinning equations (33) and (34) again. In terms of variables $\phi_r$ and t, Eqs. (33) and (34) can be rewritten as $$\gamma = \phi_r - \pi + \gamma_m/2 - t; \quad (36)$$

$$g_m(\gamma, t) = g_m[\gamma(\phi_r), t] = g(\phi_r, t). \quad (37)$$

Using the chain rule of differentiation, we obtain:

$$\frac{\partial}{\partial q}g(\phi_r, q)\Big|_{g=t} = \frac{\partial}{\partial t}g_m[\gamma(\phi_r, t)], \quad (38)$$

$$= \frac{\partial}{\partial q}g_m[\gamma(\phi_r, t), q]_{q=t} + \frac{\partial \gamma}{\partial t}\frac{\partial}{\partial \gamma}g_m[\gamma(\phi_r, t), t],$$

$$= \frac{\partial}{\partial q}g_m(\gamma, t) - \frac{\partial}{\partial \gamma}g_m(\gamma, t).$$

Two factors allow us to determine the integral interval for the new variable $\gamma$ to be $[0, \gamma_m]$. The data is non-truncated and the image function $f(\vec{x})$ has a compact support. After taking into account the unit Jacobian for the variable changing from $(\phi_r, t)$ to $(\gamma, t)$, we rewrite Eq. (32) as:

$$f(\vec{x}) = -\frac{1}{4\pi^2}\int dt \frac{w(\vec{x},t)\mathrm{sgn}(x - R\cos t)}{|\vec{x} - \vec{y}(t)|} \times \quad (39)$$

$$\int_0^{\gamma_m} d\gamma \frac{1}{\cos(\beta^\perp - t - \gamma + \gamma_m/2)}\left(\frac{\partial}{\partial t} - \frac{\partial}{\partial \gamma}\right)g_m(\gamma, t).$$

Using the property derived in the Appendix B, we can write the above formula in a way to show the FBP structure transparently. That is:

$$f(\vec{x}) = -\frac{1}{4\pi^2}\int dt \frac{w(\vec{x},t)}{|\vec{x} - \vec{y}(t)|} \quad (40)$$

$$\int_0^{\gamma_m} d\gamma \frac{1}{\sin(\theta - \gamma + \gamma_m/2)}\left(\frac{\partial}{\partial t} - \frac{\partial}{\partial \gamma}\right)g_m(\gamma, t).$$

Here variable $\theta$ depends on the parameter t. As shown in the Appendix A, it is defined by the following equation:

$$\tan\theta = \frac{y\cos t - x\sin t}{x\cos t + y\sin t - R}. \quad (41)$$

To avoid the differentiation of the measured data in the above equation, a standard practice is to perform integration by parts so that we can trade the derivatives to the prefactors which can be calculated analytically before we digitally implement the method. This analytical operation leads us to a new reconstruction method. As shown in Appendix A, the integration by parts yields the following reconstruction formula:

$$f(\vec{x}) = -\frac{1}{4\pi^2}\frac{w(\vec{x},t)}{|\vec{x} - \vec{y}(t)|}\int_0^{\gamma_m} d\gamma \frac{g_m(\gamma, t)}{\sin(\theta - \gamma + \gamma_m/2)}\Big|_{t=t_i}^{t=t_f} + \quad (42)$$

$$\frac{1}{4\pi^2}\int dt \frac{w'(\vec{x},t)}{|\vec{x} - \vec{y}(t)|}\int_0^{\gamma_m} d\gamma \frac{g_m(\gamma, t)}{\sin(\theta - \gamma + \gamma_m/2)} +$$

$$\frac{1}{4\pi^2}\int dt \frac{Rw(\vec{x},t)}{|\vec{x} - \vec{y}(t)|^2}\int_0^{\gamma_m} d\gamma \frac{g_m(\gamma, t)\cos(\gamma - \gamma_m/2)}{[\sin(\theta - \gamma + \gamma_m/2)]^2}.$$

Equations (42) and (41) are the optimal formulas for an accurate reconstruction of the ROI from the fan beam projections produced by the third generation scanner of FIG. 7, provided the x-ray source trajectory revolves around the ROI to satisfy the data sufficiency condition Eq. (11). In Eq. (42), the integral over $t\epsilon\Lambda$ is implied. Compared with Eq. (39), this new formula allows us to reconstruct the image sequentially. The formula (42) suggests the following steps to reconstruct the image:

STEP 1: For each view, multiply the measured data by a factor $\cos(\gamma-\gamma_m/2)$, after this step, we obtain modified projections:

$$\tilde{g}_m(\gamma,t) = g(\gamma,t)\cos(\gamma-\gamma_m/2).$$

STEP 2: For each view, filter the measured data by a filter $$\frac{1}{\sin(\gamma - \gamma_m/2)}$$

(the result is called $Q_1(\theta)$) and filter the modified projections by the other filter $$\frac{1}{\sin^2(\gamma - \gamma_m/2)}$$

(the result is called $Q_2(\theta)$).

STEP 3: For each view, backproject the filtered data $Q_1(\theta)$ with a weight $$\frac{w'(\vec{x},t)}{|\vec{x} - \vec{y}(t)|}$$

and backproject the filtered data $Q_2(\theta)$ with a weight $$\frac{Rw(\vec{x},t)}{|\vec{x} - \vec{y}(t)|^2}.$$

STEP 4: Add up all the contributions from all the different view angles t.

In this manner an image is produced immediately by the above filtered backprojection.

In the preceding section an optimal reconstruction formula for an equiangular third generation arc detector was described. Now we describe an optimal reconstruction formula for fan beam projections acquired with a circular trajectory, third generation scanner having an equally-spaced, collinear detector as shown in FIG. 9.

Figure 9:
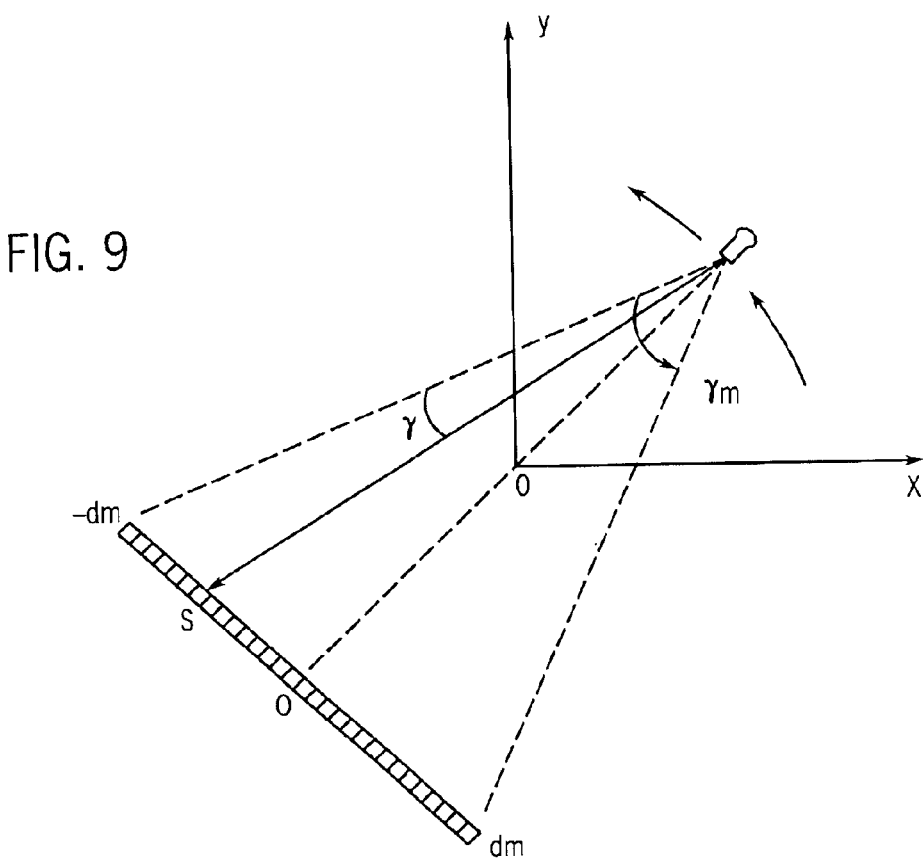
FIG. 9 is a schematic representation of another third generation CT system with coordinate system used to describe the application of the invention to another preferred embodiment.

From the geometry depicted in FIG. 9, we have the following coordinate transformation:

$$\gamma = \frac{\gamma_m}{2} + \arctan\frac{s}{2R}. \quad (43)$$

Using this relation, as shown in Appendix B, Eq. (42) can be changed into:

$$f(\vec{x}) = -\frac{1}{4\pi^2}\frac{w(\vec{x},t)}{R - x\cos t - y\sin t}\int_{-d_m}^{d_m} ds\, h_H(\tilde{s} - s)\tilde{g}(s, t)\Big|_{t=t_i}^{t=t_f} + \quad (44)$$

$$\frac{1}{4\pi^2}\int dt \frac{w'(\vec{x},t)}{R - x\cos t - y\sin t}\int_{-d_m}^{d_m} ds\, h_H(\tilde{s} - s)\tilde{g}(s, t) +$$

$$\frac{1}{4\pi^2}\int dt \frac{Rw(\vec{x},t)}{(R - x\cos t - y\sin t)^2}\int_{-d_m}^{d_m} ds\, h_R(\tilde{s} - s)\tilde{g}(s, t),$$

where $h_H(s)$ and $h_R(x)$ are a Hilbert filter and a Ramp filter defined as follows:

$$h_H(n\Delta x) = \frac{2}{n\Delta x}, \quad n = \text{odd}, \tag{45}$$

$$h_R(x) = \int_{-\infty}^{+\infty} d\omega |\omega| e^{i2\pi\omega x}. \tag{46}$$

We also introduced a new variable $\tilde{s}$ which is defined by:

$$\tilde{s} = 2R\tan\theta = 2R\frac{x\sin t - y\cos t}{x\cos t + y\sin t - R}. \tag{47}$$

In addition, the $\tilde{g}(s,t)$ is rescaled projection data given by the following equation:

$$\tilde{g}(s,t) = \frac{2R}{\sqrt{s^2 + 4R^2}} g_m(s,t). \tag{48}$$

Therefore, the implementation of Eq. (44) requires the following steps:

1. Filter each acquired view with $1/\sin(\gamma-\gamma_m/2)$;
2. Backproject each resulting filtered view $Q_1(\theta)$ with weight $W'(\vec{x},t)/|\vec{x}-\vec{y}(t)|$;
3. Add the backprojected view to an image;
4. Filter each acquired view with $\cos(\gamma-\gamma_m/2)/[\sin(\gamma-\gamma_m/2)*\sin(\gamma-\gamma_m/2)]$;
5. Backproject each resulting filtered view $Q_2(\theta)$ with weight $RW(\vec{x},t)/|\vec{x}-\vec{y}(t)|$; and
6. Add backprojected view to the image.

The image evolves as successive views $g(\gamma,t)$ are acquired and processed to change from a blurry, unrecognizable subject to a finished image.

Using the image reconstruction method indicated above in Eq. (24) one ends up with a general filtered backprojection scheme. It is general in the sense that it yields a mathematically exact image reconstruction for any differentiable planar x-ray source trajectory and any detector configuration. The image reconstruction methods indicated by Eqs. (42) and (44) produce mathematically exact images for the clinically useful scanner geometries having a circular x-ray source trajectory with a third generation arc detector and collinear detector respectively. The method expressed by Eqs. (42) and (44) are valid for a wide range of weighting functions, they do not require taking the derivative of acquired attenuation data, and the image reconstruction can be performed sequentially in real time. That is, each view can be processed after it is acquired to form an image and the image is continuously improved as more views are acquired and processed. As will now be discussed, two extra terms in these reconstruction equations also enable the scan path to be shortened without truncating the data set needed to produce an artifact free image.

Figure 10:
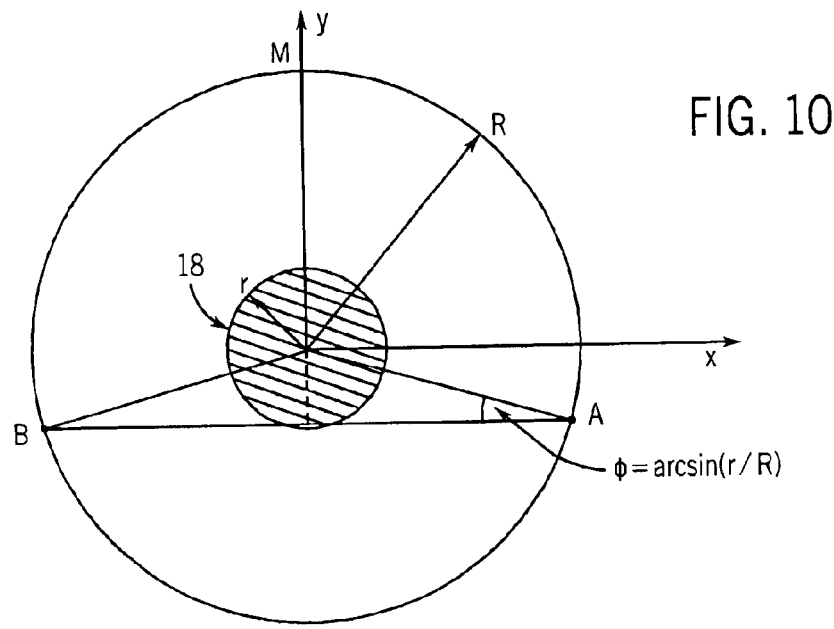
FIG. 10 is a schematic representation of a CT system region of interest with coordinates and variables used to explain the minimum gantry movement required during a scan.

We now analyze the data sufficiency condition dictated by inversion formula (12) with reference to FIG. 10. We first specify a region of interest (ROI) 18 for the object to be imaged. The ROI may be the whole function support region $\Omega$ of the scanner, or it may be a smaller part of the function support region $\Omega$.

To define an intermediate function $G_2[\vec{k}, \vec{y}(t)]$ for a specific point $\vec{y}(t)$ on the source trajectory, as shown in the Eq. (3), we need to know all the projections $g[\vec{r}, \vec{y}(t)]$. The acquired data is not allowed to be truncated and we therefore need to know all the line integrals in a fan containing the whole object.

The question is how long the x-ray source scan path must be to acquire the necessary projections. For a specific point $\vec{x}$ within the ROI, we can use Eq. (12) to calculate $f(\vec{x})$ provided the following mathematical condition is satisfied:

Condition: For every point $\vec{x}$ within the ROI 18 and an arbitrary direction $\hat{k}$, we need at least one focal position $\vec{y}(t)$ to satisfy Eq. (11).

This mathematical condition can be summarized into the following statement for the fan beam data sufficient condition. To accurately reconstruct an image for a given ROI, we require that any straight line passing through the ROI should intersect the x-ray source trajectory at least once. We call such a source trajectory a complete trajectory $\Lambda$.

Referring to FIG. 10, if we consider a circular source trajectory with radius R, the ROI 18 consists of a concentric disc region with radius r<R, then the data sufficiency condition Eq. (11) requires that the x-ray source trajectory is the bigger arc (AMB) of the circle. It is easy to see that the corresponding angle for this arc is $\pi+2 \arcsin(r/R)$.

As indicated above, a number of possibilities are available for the choice of the weighting function $w(\vec{x},t)$. Two prescriptions for the weighting function are preferred. It is important to understand that this invention is the first method to explicitly introduce image pixel $\vec{x}$ into a weighting function. In the first method, a ray-driven weighting function is used in which the weighting function does not depend on the image pixels. In other words, there is no $\vec{x}$ dependence. In the second method, a pixel-driven weighting function is used in which the choice of the weighting function strongly depends on the pixels.

Ray-Driven Weighting Function

Arbitrarily pick one smooth (e.g., can take the derivative) and positive-definite (i.e., non-negative everywhere) function C(t), where t is defined on the complete trajectory $\Lambda$, and outside this range, C(t)=0. Then the weighting function can be given by:

$$w(\vec{x}, t) = W(t) = \frac{C(t)}{C(t) + C(t + \pi + 2\gamma)},$$

where $\gamma$ is the index of the detector counted from the central line (i.e., the line between the source position and the system isocenter).

Pixel-Driven Weighting Function

Figure 14:
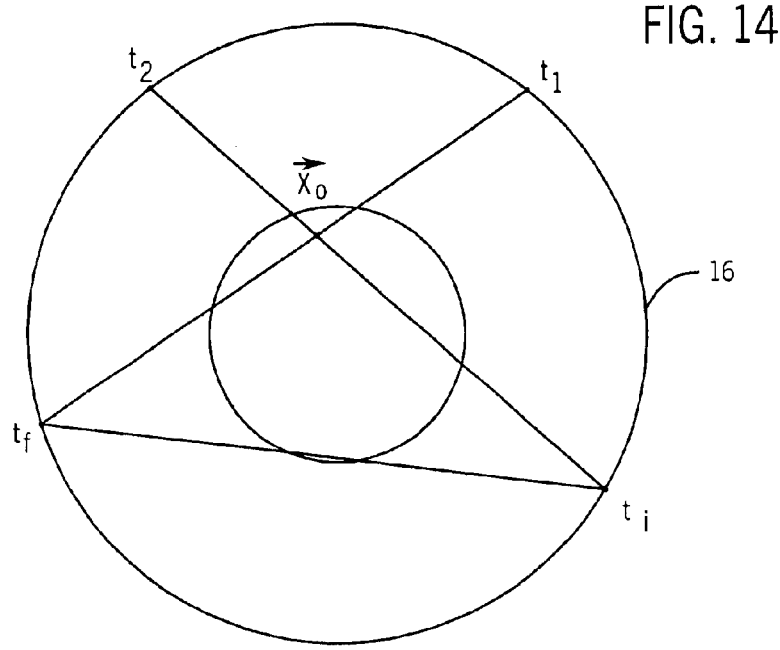
FIG. 14 is a pictorial representation of the FOV of the CT system of FIG. 7 used to explain weighting.
Figure 15:
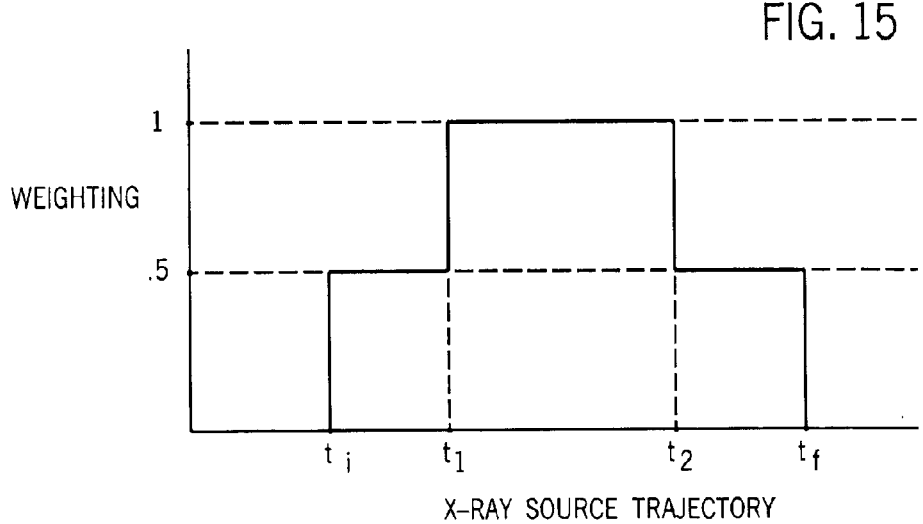
FIG. 15 is a graphic representation of the weighting used in the method of FIG. 13.

Referring particularly to FIG. 14, for each specific pixel $\vec{x}_0$, draw two straight lines between $\vec{x}_0$ and two end points labeled $t_i$ and $t_f$ on the source trajectory 16. These two lines will intersect the source trajectory at two other points labeled $t_1$ and $t_2$. Noting that points $t_1$ and $t_2$ are strongly pixel dependent. Points $t_i,t_1,t_2,t_f$ cut the complete trajectory 16 into three pieces: $(t_i,t_1)\cup(t_1,t_2)\cup(t_2,t_f)$. The weighting scheme is to assign weight ½ for the first and last pieces of the orbit and assign weight 1 for the second piece as shown in FIG. 15. Using this method, the second terms in equations (42) and (44) do not play any role and thus the computational load can be reduced by just calculating the first and the last terms.

DESCRIPTION OF THE PREFERRED EMBODIMENT

Figure 11:
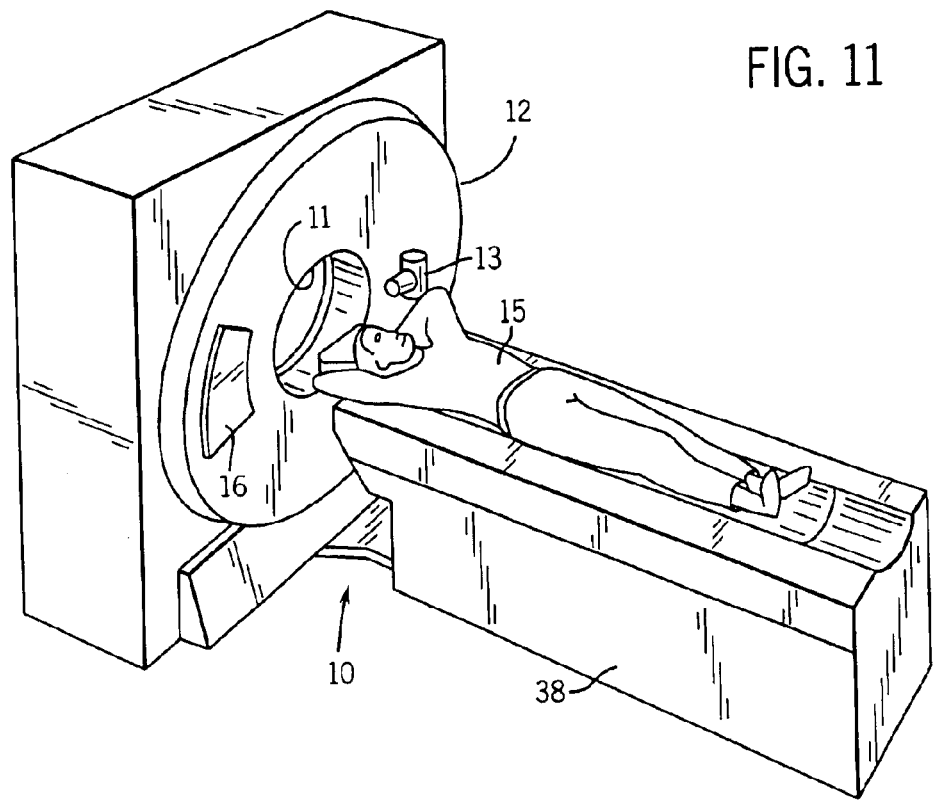
FIG. 11 is a pictorial view of a CT system which employs the present invention.
Figure 12:
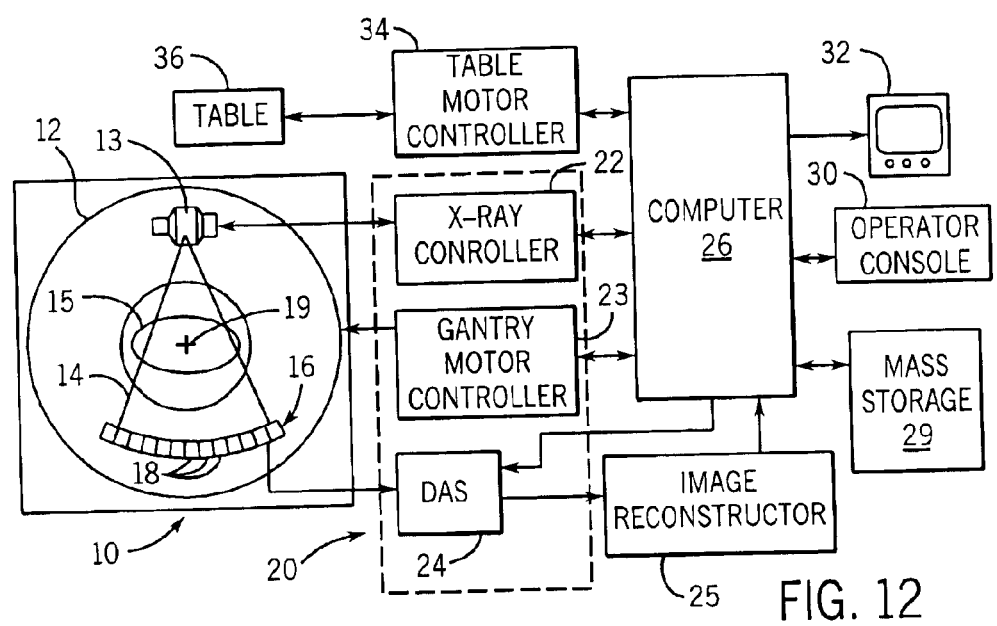
FIG. 12 is a block diagram of the CT system of FIG. 11.

With initial reference to FIGS. 11 and 12, a computed tomography (CT) imaging system 10 includes a gantry 12 representative of a "third generation" CT scanner. Gantry 12 has an x-ray source 13 that projects a fan beam of x-rays 14 toward a detector array 16 on the opposite side of the gantry. The detector array 16 is formed by a number of detector elements 18 which together sense the projected x-rays that pass through a medical patient 15. Each detector element 18 produces an electrical signal that represents the intensity of an impinging x-ray beam and hence the attenuation of the beam as it passes through the patient. During a scan to acquire x-ray projection data, the gantry 12 and the components mounted thereon rotate about a center of rotation 19 located within the patient 15.

The rotation of the gantry and the operation of the x-ray source 13 are governed by a control mechanism 20 of the CT system. The control mechanism 20 includes an x-ray controller 22 that provides power and timing signals to the x-ray source 13 and a gantry motor controller 23 that controls the rotational speed and position of the gantry 12. A data acquisition system (DAS) 24 in the control mechanism 20 samples analog data from detector elements 18 and converts the data to digital signals for subsequent processing. An image reconstructor 25, receives sampled and digitized x-ray data from the DAS 24 and performs high speed image reconstruction according to the method of the present invention. The reconstructed image is applied as an input to a computer 26 which stores the image in a mass storage device 29.

The computer 26 also receives commands and scanning parameters from an operator via console 30 that has a keyboard. An associated cathode ray tube display 32 allows the operator to observe the reconstructed image and other data from the computer 26. The operator supplied commands and parameters are used by the computer 26 to provide control signals and information to the DAS 24, the x-ray controller 22 and the gantry motor controller 23. In addition, computer 26 operates a table motor controller 34 which controls a motorized table 36 to position the patient 15 in the gantry 12.

The CT imaging system is operated to acquire views of attenuation data g(γ,t) at a series of gantry angles γ as the x-ray source 13 is moved to a series of locations t on a circular path. In the preferred embodiment an arcuate shaped detector array 16 is employed and the reconstruction method according to the above equation (44) is employed. As will now be described, each acquired view g(γ,t) is processed in near real time and the resulting backprojecting image data is added to an image data set which can be displayed even as the scan is being performed.

Figure 13:
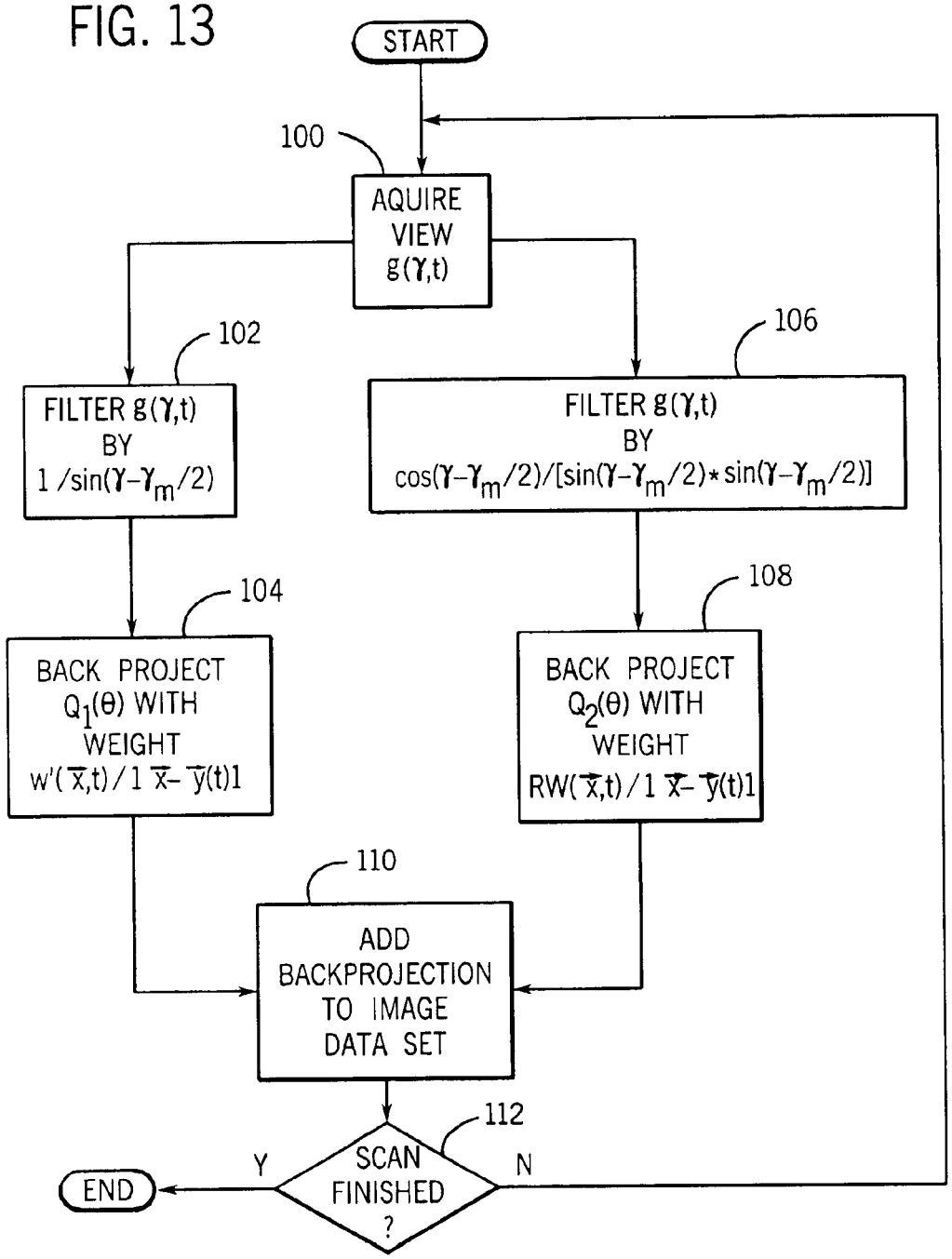
FIG. 13 is a flow chart of the steps performed by the CT system of FIGS. 11 and 12 to practice a preferred embodiment of the invention.

Referring particularly to FIG. 13, each view is acquired as indicated at process block 100 and processed in two parallel paths. In the first path the attenuation data g(γ,t) is filtered by multiplying by a first filter $1/\sin(\gamma-\gamma_m/2)$ as indicated by process block 102. The resulting filtered data set $Q_1(\theta)$ is then backprojected as indicated at process block 104 with a weighting factor of $w'(\vec{x},\vec{y})/|\vec{x}-\vec{y}(t)|$.

The same attenuation data g(γ,t) is processed in a second path in which it is first filtered as indicated by process block 106 with $\cos(\gamma-\gamma_m/2)/[\sin(\gamma-\gamma_m/2)*\sin(\gamma-\gamma_m/2)]$. The resulting filtered data set is then backprojected as indicated at process block 108 with a weight $RW(\vec{x},t)/|\vec{x}-\vec{y}(t)|$.

The resulting image data from the two, parallel backprojections 104 and 108 are added to an image data set as indicated at process block 110. As the scan progresses more image data is added to the image data set and the displayed image progressively improves in clarity and becomes devoid of image artifacts. The system loops back at decision block 112 until sufficient views have been acquired to satisfy the data sufficiency condition of Eq. (11).

It should be apparent that a very similar process is employed to reconstruct an image from a third generation CT scanner having a collinear detection array such as that shown in FIG. 9. The filter factors and weighting function are different, but the process is otherwise the same as that illustrated in FIG. 13.

The generalized form of the reconstruction method as expressed in Eq. (24) may be employed when the x-ray source travels a non-circular path. It is contemplated that this reconstruction method may be used when the x-ray source does not follow a perfect circular path due to manufacturing tolerances or wear. In such case, the exact path is measured during a calibration procedure and Equation (24) is implemented in the reconstruction process using the exact, measured source path.

Appendix A

In this appendix, we derive reconstruction formula Eq. (42). Using Eqs. (27), (28) and (31), we obtain $$\frac{\text{sgn}(x-R\cos t)}{|\vec{x}-\vec{y}(t)|\cos(\beta^\perp-\phi_r)} = \frac{1}{x\sin\phi_r - y\cos\phi_r - R\sin(\phi_r-t)} = P(\vec{x};\gamma,t). \quad (55)$$

Using $\phi_r = \pi + t + \gamma - \gamma_m/2$, we obtain $$x\sin\phi_r - y\cos\phi_r - R\sin(\phi_r-t) \quad (56)$$

$$= (-x\sin t - y\cos t)\cos(\gamma - \frac{\gamma_m}{2}) + (R - x\cos t - y\sin t)\sin(\gamma - \frac{\gamma_m}{2})$$

$$= 1[\sin\theta\cos(\gamma - \frac{\gamma_m}{2}) - \cos\theta\sin(\gamma - \frac{\gamma_m}{2})],$$

$$= 1\sin(\theta - \gamma + \frac{\gamma_m}{2}),$$

where we introduced length 1 and angler theta as follows:

$$\tan\theta = \frac{x\sin t - y\cos t}{x\cos t + y\sin t - R}, \quad (57)$$

$$1 = \sqrt{(x\sin t - y\cos t)^2 + (x\cos t + y\sin t - R)^2}, \quad (58)$$

$$= \sqrt{(x-R\cos t)^2 + (y-R\sin t)^2} \quad (59)$$

$$= |\vec{x}-\vec{y}(t)|.$$

Therefore, we obtain $$P(\vec{x};\gamma,t) = \frac{1}{|\vec{x}-\vec{y}(t)|\sin(\theta-\gamma+\gamma_m/2)}. \quad (60)$$

In addition, using Eq. (55) and $\phi_r = \pi + t + \gamma - \gamma_m/2$, we can calculate its derivatives as following:

$$\left(\frac{\partial}{\partial t} - \frac{\partial}{\partial \gamma}\right)P(\vec{x};\gamma,t) = P^2(\vec{x};\gamma,t)R\cos(\gamma - \frac{\gamma_m}{2}) \quad (61)$$

Substituting the above equation into Eq. (39), we obtain $$f(\vec{x}) = -\frac{1}{4\pi^2}\int dt \int_0^{\gamma_m} w(\vec{x},t)P(\vec{x};\gamma,t)\left(\frac{\partial}{\partial t} - \frac{\partial}{\partial \gamma}\right)g_m(\gamma,t), \quad (62)$$

-continued $$= -\frac{1}{4\pi^2}\int dt \int_0^{\gamma_m}\left(\frac{\partial}{\partial t}-\frac{\partial}{\partial \gamma}\right)[w(\vec{x},t)P(\vec{x};\gamma,t)g_m(\gamma,t)] +$$

$$\frac{1}{4\pi^2}\int dt \int_0^{\gamma_m} g_m(\gamma,t)\left(\frac{\partial}{\partial t}-\frac{\partial}{\partial \gamma}\right)[w(\vec{x},t)P(\vec{x};\gamma,t)],$$

$$= -\frac{1}{4\pi^2}\int_0^{\gamma_m} w(\vec{x},t)P(\vec{x};\gamma,t)g_m(\gamma,t)\bigg|_{t=t_i}^{t=t_f} +$$

$$\frac{1}{4\pi^2}\int dt\, w(\vec{x},t)P(\vec{x};\gamma,t)g_m(\gamma,t)\bigg|_{\gamma=0}^{\gamma=\gamma_m} +$$

$$\frac{1}{4\pi^2}\int dt \int_0^{\gamma_m} g_m(\gamma,t)\left(\frac{\partial}{\partial t}-\frac{\partial}{\partial \gamma}\right)[w(\vec{x},t)P(\vec{x};\gamma,t)].$$

Since we have assumed that the data is non-truncated, we have $$g_m(\gamma=0,t)=0=g_m(\gamma=\gamma_m,t). \quad (63)$$

Thus the second term in the above equation vanishes. Thus we obtain $$f(\vec{x}) = -\frac{1}{4\pi^2}\int_0^{\gamma_m} w(\vec{x},t)P(\vec{x};\gamma,t)g_m(\gamma,t)\bigg|_{t=t_i}^{t=t_f} + \quad (64)$$

$$\frac{1}{4\pi^2}\int dt \int_0^{\gamma_m} g_m(\gamma,t)\left(\frac{\partial}{\partial t}-\frac{\partial}{\partial \gamma}\right)[w(\vec{x},t)P(\vec{x};\gamma,t)].$$

Using Eq. (61), we can calculate the derivatives in Eq. (64). The result is $$\left(\frac{\partial}{\partial t}-\frac{\partial}{\partial \gamma}\right)[w(\vec{x},t)P(\vec{x};\gamma,t)]=BP_1(\vec{x};\gamma,t)+BP_2(\vec{x};\gamma,t), \quad (65)$$

where we have introduced two backprojection kernels $BP_1(\vec{x};\gamma,t)$ and $BP_2(\vec{x};\gamma,t)$ as follows $$BP_1(\vec{x};\gamma,t) = P(\vec{x};\gamma,t)\frac{dw(\vec{x},t)}{dt} = P(\vec{x};\gamma,t)w'(\vec{x},t); \quad (66)$$

$$BP_2(\vec{x};\gamma,t) = Rw(\vec{x},t)\cos\left(\gamma-\frac{\gamma_m}{2}\right)[P(\vec{x};\gamma,t)]^2. \quad (67)$$

Substituting Eqs. (60), (66), and (67) into Eq. (64), we obtain Eq. (42).

Appendix B

In this appendix, we show how to derive the Eq. (52). Using the Eq. (51), we have $$d\gamma = \frac{2R}{s^2+4R^2}ds, \quad (68)$$

$$\cos\left(\gamma-\frac{\gamma_m}{2}\right) = \frac{2R}{\sqrt{s^2+4R^2}}, \quad (69)$$

$$\sin\left(\gamma-\frac{\gamma_m}{2}\right) = \frac{s}{\sqrt{s^2+4R^2}}. \quad (70)$$

On the other hand, we have $$|\vec{x}-\vec{y}(t)|\sin\left(\theta-\gamma+\frac{\gamma_m}{2}\right) \quad (71)$$

$$= |\vec{x}-\vec{y}(t)|[\sin\theta\cos(\gamma-\frac{\gamma_m}{2})-\cos\theta\sin(\gamma-\frac{\gamma_m}{2})] \quad (72)$$

$$= (-x\sin t + y\cos t)\frac{2R}{\sqrt{s^2+4R^2}} - (R-x\cos t - y\sin t)\frac{s}{\sqrt{s^2+4R^2}},$$

$$= \frac{R-x\cos t - y\sin t}{\sqrt{s^2+4R^2}}(2R\tan\theta - s),$$

where we used Eq. (56) amd Eq. (57). After we plug Eqs. (68), (69) and (71) into Eq. (42), we obtain Eq. (52).

What is claimed is:

1. A method for producing an image with a computed tomography imaging system having an x-ray source that moves around a region of interest in a path $\vec{y}(t)$ and a detector which receives x-rays passing through the region of interest along a path $\vec{r}$, the steps comprising:
   a) acquiring a set of projection data $g(\vec{r},\vec{y},(t))$ which measures the x-ray attenuation of a subject in the region of interest;
   b) calculating the derivative of the acquired projection data with respect to the x-ray source trajectory;
   c) convolving the derivative data with a kernel function;
   d) performing a weighted backprojection of the convolved data;
   e) adding the backprojected data to an image; and
   f) repeating steps a) though e) a plurality of times as the x-ray source moves around the subject.

2. The method as recited in claim 1 where the kernel function is $1/\hat{\beta}^{\perp}\cdot\hat{r}$;.

3. The method as recited in claim 1 where the weighting in step d) is $1/\hat{\beta}^{\perp},\vec{x};t)\text{sgn}[\vec{\beta}^{\perp}\cdot\vec{y}'(t)]/|\vec{x}-\vec{y}(t)|$.

4. A method for producing an image with a computer tomography imaging system having an x-ray source that moves in a circular path around a region of interest and a detector array which receives a fan beam of x-rays passing through the region of interest, the steps comprising:
   a) acquiring a set of projection data which measures the x-ray attenuation of a subject in the region of interest at one view angle of the x-ray source and detector array;
   b) filtering each acquired set of projection data with a first filter;
   c) backprojecting each resulting filtered view $Q_1(\theta)$ with a first weight;
   d) adding the backprojected data to the image;
   e) filtering each acquired set of projection data with a second filter;
   f) backprojecting each resulting filtered view $Q_2(\theta)$ with a second weight;
   g) adding the backprojected data from step f) to the image; and
   h) repeating steps a) though g) as the x-ray source is moved around the circular path.

5. The method as recited in claim 4 in which the x-ray source moves less than 180° around the circular path during the production of the image and the minimum number of degrees of movement needed to complete the image is determined by the size of an object to be imaged in the region of interest.

6. The method as recited in claim 4 in which the first filter is $1/\sin(\gamma-\gamma_m/2)$.

7. The method as recited in claim 6 in which the second filter is $1/\sin^2(\gamma-\gamma_m/2)$.

8. The method as recited in claim 7 in which the first weight is $$\frac{w'(\vec{x}, t)}{|\vec{x} - \vec{y}(t)|}.$$

9. The method as recited in claim 8 in which the second weight is $$\frac{Rw(\vec{x}, t)}{|\vec{x} - \vec{y}(t)|^2}.$$

10. The method as recited in claim 4 in which the first filter is $1/\sin(\gamma-\gamma_m/2)$.

11. The method as recited in claim 10 in which the second filter is $\cos(\gamma-\gamma_m/2/[\sin(\gamma-\gamma_m/2)*\sin(\gamma-\gamma_m/2)]$.

12. The method as recited in claim 11 in which the first weight is $W'(\vec{x},t)/|\vec{x} - \vec{y}(t)|$.

13. The method as recited in claim 12 in which the second weight is $RW(\vec{x},t)/|\vec{x} - \vec{y}(t)|$.

* * * * *